July 4, 1950 — J. C. HEINTZ — 2,513,482
TIRE RETREADING MOLD HAVING AN INSIDE CURING RIM
Filed Feb. 15, 1946 — 2 Sheets-Sheet 1

INVENTOR.
JAMES C. HEINTZ
BY Gordon C. Mack

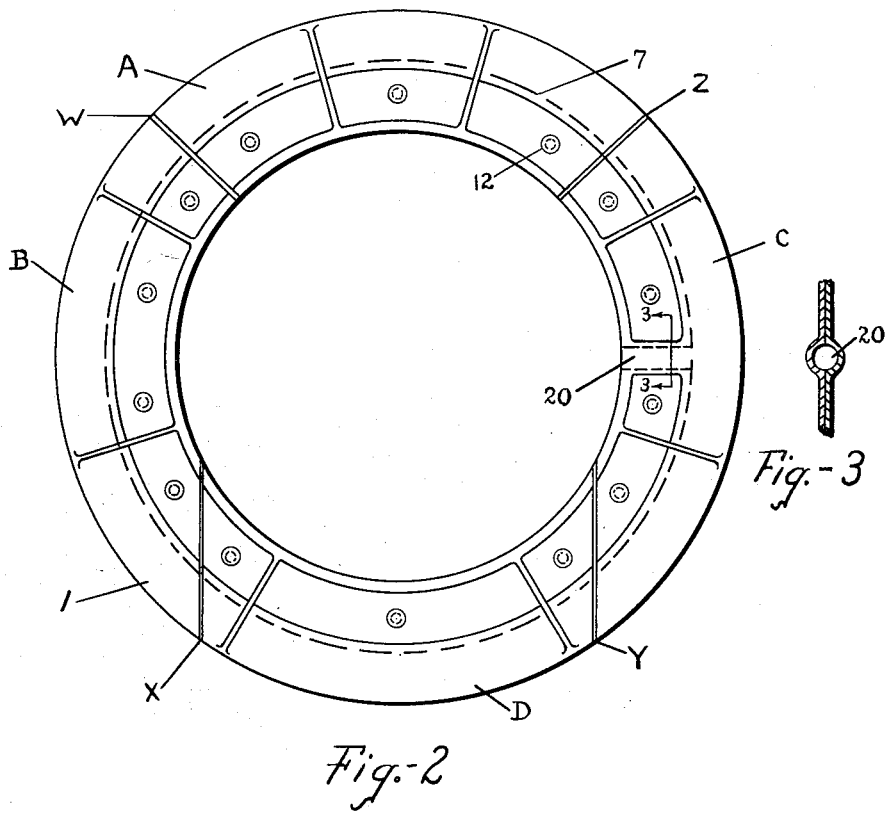
Fig.-3
Fig.-2
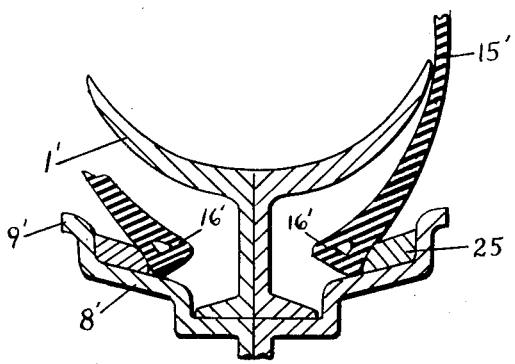
Fig.-4
INVENTOR.
JAMES C. HEINTZ
BY Gordon C. Mack Patented July 4, 1950

2,513,482

UNITED STATES PATENT OFFICE 2,513,482

TIRE RETREADING MOLD HAVING AN INSIDE CURING RIM

James C. Heintz, Lakewood, Ohio

Application February 15, 1946, Serial No. 647,824

6 Claims. (Cl. 18—18)

This invention relates to an inside curing rim with means for centering the rim in a full-circle mold and for supporting the beads of a tire as it is being retreaded. Thus, the tire is centered in the mold during the retreading operation, and in the preferred embodiment of the invention this centering is accomplished by contact between laterally extending centering means and the inner walls of the molding cavity. Such centering is becoming increasingly important, as in the retreading of airplane tires and the like where it is essential that during the retreading operation the center line of the tread coincide with the center line of the mold.

According to this invention the inside curing rim is centered on a supporting inner rim, the flanges of which contact the different halves of the mold and center both rims in the mold. The inner rim is designed to support the beads of the tire, and this aids in centering the tire in the mold. By using removable spacing rings, the same inner rim may be used to center tires of different sizes. The invention will be further described in connection with the accompanying drawings, in which:

Fig. 2 shows a side view of the inner rim;

Fig. 3 is a section on the line 3—3 of Fig. 2; and

Fig. 4 is a section of a modified view, with a part broken away.

Figure 1:
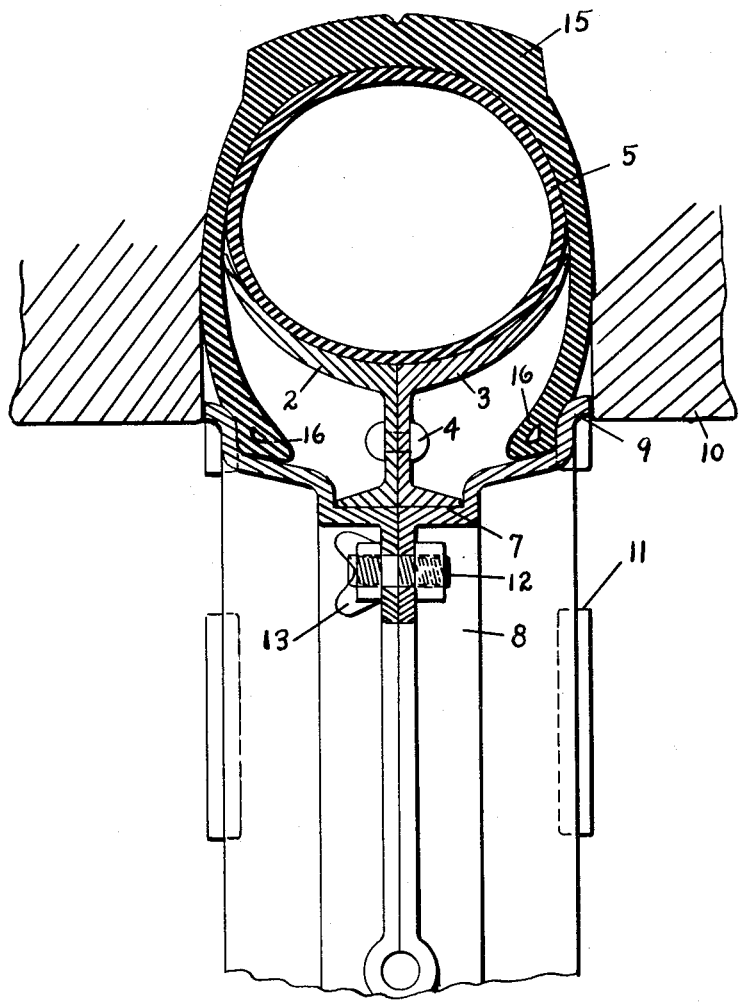
Fig. 1 is an enlarged section, partly broken away, showing the inside curing rim, the inner supporting rim, the tire, and mold.

The inside curing rim 1 is divided laterally into the halves 2 and 3 which are riveted together by the rivets 4. This supports the half round bag 5.

The inside curing rim is supported in the countersunk portion 7 of the inner rim 8 and is thus centered on this inner rim. The projections 9 on the flanges of the inner supporting rim center both rims in the mold 10. These projections are formed by notching the rim at 11 to provide only about six projections and thus lessen the weight of the rim and facilitate the removal of the tire when the retreading operation is completed. The inner supporting rim 8 is formed of two halves which are united by the threaded studs 12 and may be easily separated and joined by the removal and replacement of winged nuts 13.

The inner supporting rim 8 is centered in the mold by the projections 9 on the edge of the rim. This centers the countersunk portion 7 of this inner rim. The inside curing rim is supported in this countersunk portion and is, therefore, at all times centered within the mold 10.

Consequently, the bag 5 is centered within the mold, and the tire 15 is also necessarily centered in the mold, especially through the aid of the inner supporting rim 8 which holds the bead portions 16 of the tire evenly balanced over the bag 5. Thus, with an inside curing rim of this type the tire is centered within the mold, and the center line of the new tread cured to the carcass in the mold is centered on the tire.

The details of construction and assembly of the inside curing rim are illustrated in Fig. 2. It is composed of four sections, A, B, C, and D, being divided at the unions W, X, Y, and Z.

In retreading a tire, the half round bag is first placed within the tire in the usual manner. Then the inside curing rim is fitted over the bag. Using the preferred structure shown in Fig. 2, section A is first put in place over the bag, then sections B and C, and finally section D is inserted. The two halves of the inner supporting rim 8 are then placed over the sections A, B, C, and D and bolted together. The valve stem of the bag 5 passes through the opening 20 of the inside curing rim. A suitable opening is provided through the countersunk portion 7 of the rim 8 for insertion of this valve stem, and a portion of the supporting web is broken away to provide access to it. When thus assembled, the tire is placed between the halves of the full-circle ring retreading or recapping mold 10, and the tire is centered in the mold by means of the projections 9 of the inner supporting rim which contact the edges of the mold.

In order to facilitate the centering of tires of approximately the same tread diameter, but different size, within the same mold, spacing rings may be used as illustrated in Fig. 4. Here the inside curing rim 1' is centered in the countersunk portion of the inner supporting rim 8'. The projections 9' on the edges of the inner rim center this rim in the mold. The beads of the tire do not rest at the flanges of the rim as illustrated in Fig. 1 but are longer, and to aid in centering the tire in the mold, spacing rings 25 are provided in each side of the inner rim, and the bead portions 16' of the tire 15' are thus evenly spaced from the flange of the rim 8' and facilitate centering of the tire within the mold. These spacing rings 25 may be of different widths to accommodate tires of different sizes.

Modifications may be made in the specific forms of the invention illustrated in the accompanying drawings and the specification without departing from the scope of the appended claims.

What I claim is:

1. A mold for retreading a tire, an inside curing rim therein, said rim being divided laterally into two halves, a flange extending radially inward from the inner edge of each half which flares outwardly at its base, said flanges being riveted together, a centrally countersunk inner rim formed of complementary segments and located radially inwardly of the inside curing rim with said bases fitted therein, said inner rim being centered in the cavity of the mold by contact between the mold and flanges which extend radially outwardly from opposite sides of said inner rim.

2. A mold for retreading a tire, an inside curing rim therein, said rim being divided laterally into two halves, a flange extending radially inward from the inner edge of each half which flares outwardly at its base, said flanges being riveted together, a centrally countersunk inner rim, floating within the mold, formed of complementary segments and located radially inwardly of the inside curing rim with said bases fitting therein, said inner rim being centered in the cavity of the mold by contact between the wall of the cavity and the flanges which extend radially outwardly from opposite sides of said inner rim, the radially outer surface of this inner rim being provided with means to receive the beads of the tire at positions equidistant from the walls of the cavity so that a tire placed in the cavity with its beads in the said positions is centered in the cavity.

3. Means for retreading a tire which comprises a mold, an inside curing rim located well up in the cavity of the mold so that a curing bag much smaller than that required to fill the whole tire may be employed, means extending radially inward from the rim substantially at the center line thereof and out of contact with both the tire and mold for supporting said rim, and means floatingly mounted within the mold extending laterally from the radially extending means and cooperating with the wall of the cavity to center the curing rim in the cavity.

4. Means for retreading a tire which comprises a mold, an inside curing rim located well up in the cavity of the mold so that a curing bag much smaller than that required to fill the whole tire may be employed, means extending radially inward from the rim substantially at the center line thereof and out of contact with both the tire and mold for supporting said rim, and means floatingly mounted within the mold extending laterally from the radially extending means and contacting the respective sides of the wall of the cavity near the inner periphery of the mold to center the curing rim in the cavity.

5. Means for retreading a tire which comprises a mold, an inside curing rim located well up in the cavity of the mold so that a curing bag much smaller than that required to fill the whole tire may be employed, means which widens at the base extending radially inward from the rim and out of contact with both the tire and mold for supporting said rim and an inner rim provided with a countersunk central portion the width of said base, with said base positioned therein and with the edges of said inner rim contacting the respective walls of the cavity of the mold so as to center the inside curing rim in the cavity.

6. Means for retreading a tire which comprises a mold, an inside curing rim located well up in the cavity of the mold so that a curing bag much smaller than that required to fill the whole tire may be employed, means which widens at the base extending radially inward from the rim and out of contact with both the tire and mold for supporting said rim, an inner rim provided with a countersunk central portion the width of said base, with said base positioned therein and with the edges of said inner rim contacting the respective walls of the cavity of the mold so as to center the inside curing rim in the cavity, and means on said inner rim to receive the beads of the tire so as to center the tire in the cavity.

JAMES C. HEINTZ.

REFERENCES CITED

The following references are of record in the file of this patent:

UNITED STATES PATENTS

| Number | Name | Date |
|---|---|---|
| 1,289,768 | Hopkinson | Dec. 31, 1918 |
| 1,372,799 | Cotter | Mar. 29, 1921 |
| 1,620,435 | Burdette | Mar. 8, 1927 |
| 1,649,169 | Laursen | Nov. 15, 1927 |
| 1,703,970 | Thorsen | Mar. 5, 1929 |